United States Patent
Poppi et al.

[19]

[11] Patent Number: 6,109,420
[45] Date of Patent: Aug. 29, 2000

[54] UNIT FOR TRANSFERRING AND TIPPING SEALED PACKAGES CONTAINING POURABLE FOOD PRODUCTS

[75] Inventors: Luca Poppi, Modena, Italy; Lennart Friberg, Vollsjo, Sweden

[73] Assignee: Tetra Laval Holdings & Finance S.A., Pully, Switzerland

[21] Appl. No.: 09/080,261

[22] Filed: May 18, 1998

[30] Foreign Application Priority Data

Jun. 27, 1997 [EP] European Pat. Off. .............. 97830319

[51] Int. Cl.$^7$ .................................................. B65G 47/24
[52] U.S. Cl. ..................... 198/417; 198/408; 198/418; 198/416; 198/724
[58] Field of Search ................................... 198/416, 417, 198/418, 391, 392, 408, 724

[56] References Cited

U.S. PATENT DOCUMENTS

| Re. 20,530 | 10/1937 | Walker . | |
|---|---|---|---|
| 2,182,880 | 12/1932 | Roberts . | |
| 4,751,997 | 6/1988 | Hirsch . | |
| 5,299,675 | 4/1994 | Schumann et al. ...................... | 198/392 |
| 5,460,262 | 10/1995 | Kennedy et al. . | |
| 5,531,310 | 7/1996 | Itoh et al. . | |
| 5,765,675 | 6/1998 | Draghetti et al. ....................... | 198/408 |
| 5,947,318 | 9/1999 | Palm ....................................... | 220/278 |
| 5,956,927 | 9/1999 | Daniele et al. ............................ | 53/430 |
| 5,966,899 | 10/1999 | Fontanazzi .............................. | 53/374.7 |

FOREIGN PATENT DOCUMENTS

| 2358319 | 10/1978 | France . |
|---|---|---|
| WO9414685 | 6/1994 | WIPO . |

*Primary Examiner*—Christopher P. Ellis
*Assistant Examiner*—Jeffrey A. Shapiro
*Attorney, Agent, or Firm*—Burns, Doane, Swecker & Mathis, L.L.P.

[57] ABSTRACT

A unit (1) for feeding a succession of sealed packages (2) containing pourable food products along a first path (P) from a supply station (4) to an output station (5), and for simultaneously tipping the packages (2) from a supply position in which the packages (2) are positioned with a respective axis (A) oriented in a first direction (B), to an output position in which the respective axis (A) is oriented in a second direction (C) perpendicular to the first direction (B); the unit (1) having a number of push arms (15) for feeding respective packages (2) along the first path (P), an actuating member (14) for moving the arms (15) along an endless second path (S) having a portion ($S_1$) in common with the first path (P), a guide (17) extending substantially along the first path (P) and cooperating with the packages (2) to move the packages (2) gradually from the supply position to the output position, and a cam (18) cooperating with each arm (15) to move the arm (15), along the first path (P), between at least a first operating position interacting with and pushing the respective package (2), and a second operating position releasing the package (2).

13 Claims, 3 Drawing Sheets

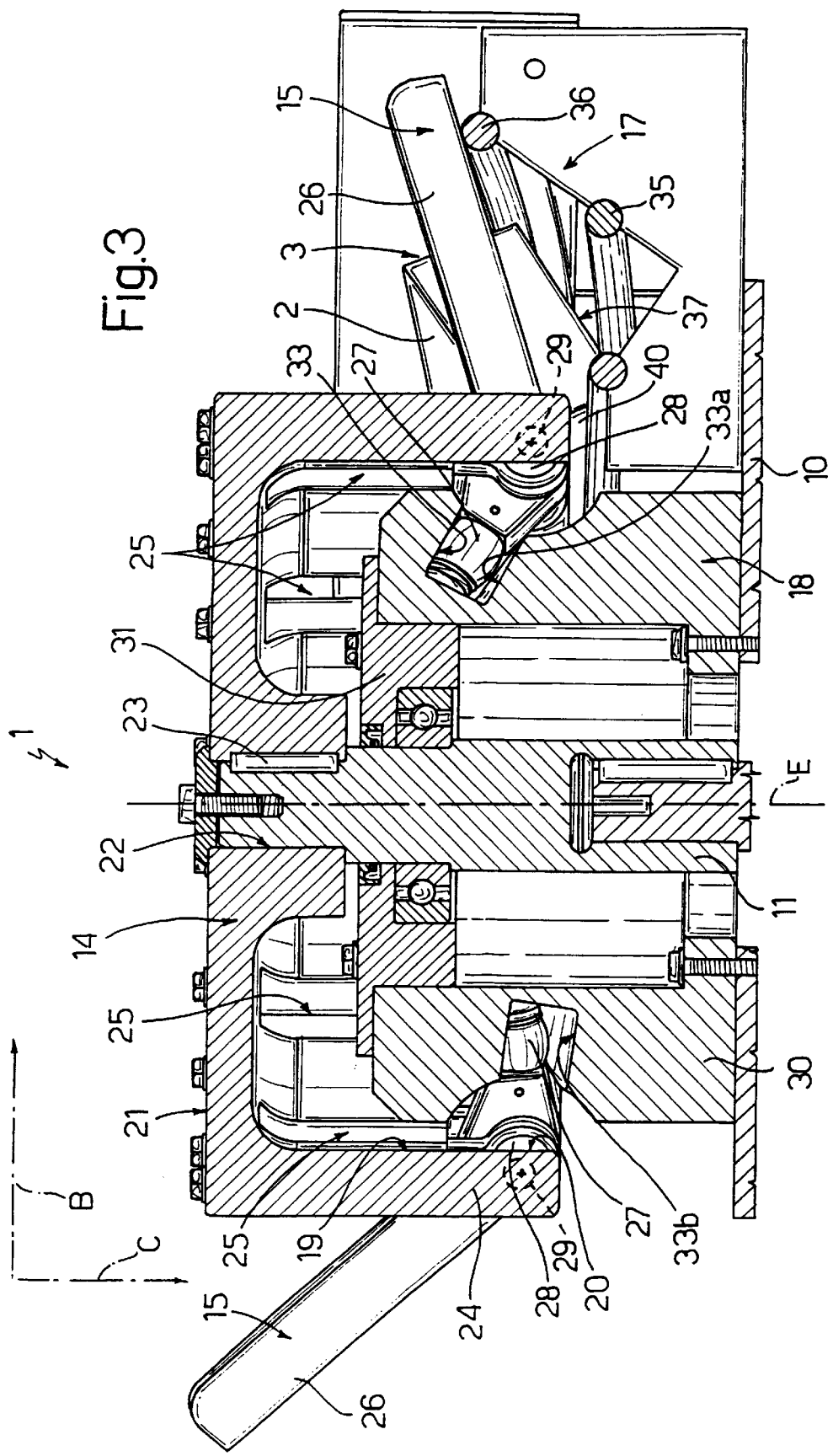

UNIT FOR TRANSFERRING AND TIPPING SEALED PACKAGES CONTAINING POURABLE FOOD PRODUCTS

This application claims priority under 35 U.S.C. §§119 and/or 365 to No. 97830319.6 filed in the EPO on Jun. 27, 1997; the entire content of which is hereby incorporated by reference.

The present invention relates to a unit for transferring and tipping aseptic sealed packages or packets containing pourable food products.

More specifically, the unit according to the present invention provides for transferring and tipping substantially parallelepiped aseptic sealed packages.

Many pourable food products, such as drinks, fruit juice, pasteurized or UHT (ultra-high-temperature treated) milk, wine, tomato sauce, etc., are sold in packages made of sterilized packaging material.

A typical example of such a package is the parallelepiped packaging container for liquid or pourable food products known by the name of Tetra Brik Aseptic (registered trademark), which is formed by folding and sealing a strip-rolled packaging material.

The rolled packaging material comprises layers of fibrous material, e.g. paper, covered on both sides with thermoplastic material, e.g. polyethylene; and the side of the packaging material eventually contacting the food product in the package also comprises a layer of barrier material, e.g. an aluminium sheet, in turn covered with a layer of thermoplastic material.

As is known, packages of the above type are produced on fully automatic packaging machines, on which a continuous tube is formed from the packaging material supplied in strip form. The strip of packaging material is sterilized on the packaging machine, e.g. by applying a chemical sterilizing agent, such as a hydrogen peroxide solution; following sterilization, the sterilizing agent is removed, e.g. vaporized by heating, from the surfaces of the packaging material; and the strip of packaging material so sterilized is kept in a closed sterile environment, and is folded and sealed longitudinally to form a tube.

The tube is filled with the sterilized or sterile-processed food product, and is sealed at equally spaced cross sections at which it is then cut into pillow-pack packets, which are subsequently folded mechanically into parallelepiped packages.

It is an object of the present invention to provide a unit for transferring and tipping sealed packages containing pourable food products, and which provides for transferring the packages reliably and at a high output rate from a supply station to an output station, and for simultaneously tipping the packages from a supply position, in which the packages are positioned with an axis oriented in a first direction, to an output position, in which the packages are positioned with the axis oriented in a second direction crosswise to the first.

It is a further object of the present invention to provide a unit, which may be used to advantage on packaging machines for continuously forming sealed packages containing pourable food products, and which, even at high output speeds, provides for transferring the packages from the packaging machine to an output conveyor without damaging or impairing the aseptic quality of the packages, and without impairing the degree of sterility of the pourable food products contained therein.

According to the present invention, there is provided a unit for transferring and tipping sealed packages containing pourable food products and each having a respective axis; said unit feeding a succession of said packages along a first path from a supply station to an output station, and simultaneously tipping the packages from a supply position in which said axis is oriented in a first direction, to an output position in which said axis is oriented in a second direction crosswise to said first direction; characterized by comprising a number of push arms cooperating with and for feeding respective said packages along said first path; actuating means for moving said arms along an endless second path comprising at least one portion in common with said first path; guide means extending substantially along said first path and cooperating with said packages to gradually move the packages from said supply position to said output position; and control means for controlling the position of said arms and cooperating with each said arm to move the arm, along said portion of said second path in common with said first path, between a first operating position interacting with and pushing a respective said package, and a second operating position releasing said package.

A preferred, non-limiting embodiment of the present invention will be described by way of example with reference to the accompanying drawings, in which:

FIG. 3 shows a larger-scale axial section of the FIG. 1 unit;

Figure 1:
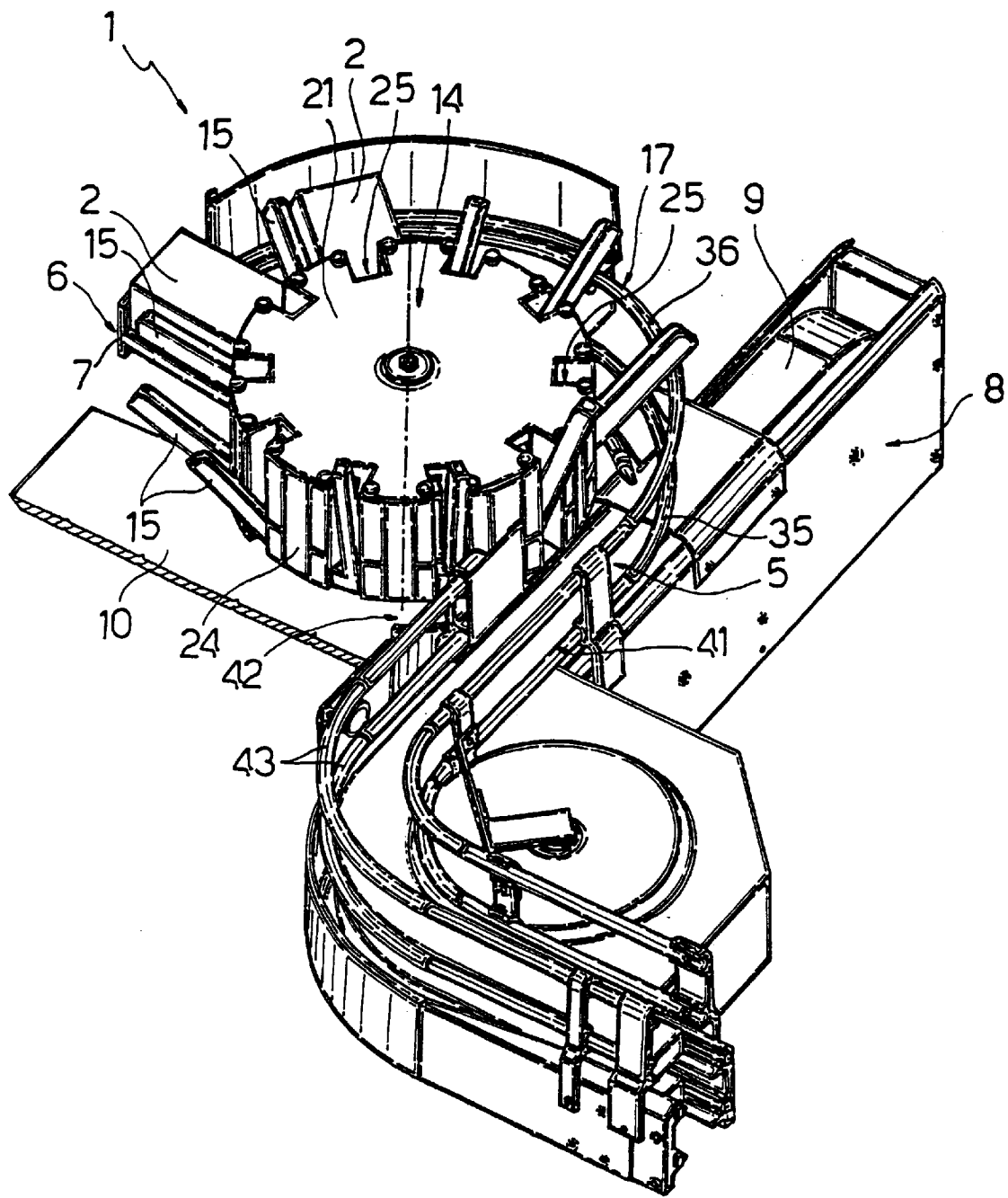
FIG. 1 shows a view in perspective, with parts removed for clarity, of a unit for transferring and tipping sealed packages containing pourable food products, in accordance with the present invention.

Number 1 in FIG. 1 indicates a unit for transferring and tipping sealed parallelepiped packages 2 containing food products, such as drinks, fruit juice, semiliquid products, and pourable food products in general. More specifically, each package 2 comprises known external opening means (not shown), and an axis A perpendicular to a top face 3.

Unit 1 is preferably designed for use on an automatic packaging machine (not shown) for producing packages 2 from said food products and from a strip rolled packaging material, and in particular defines a work station of the packaging machine.

Figure 2:
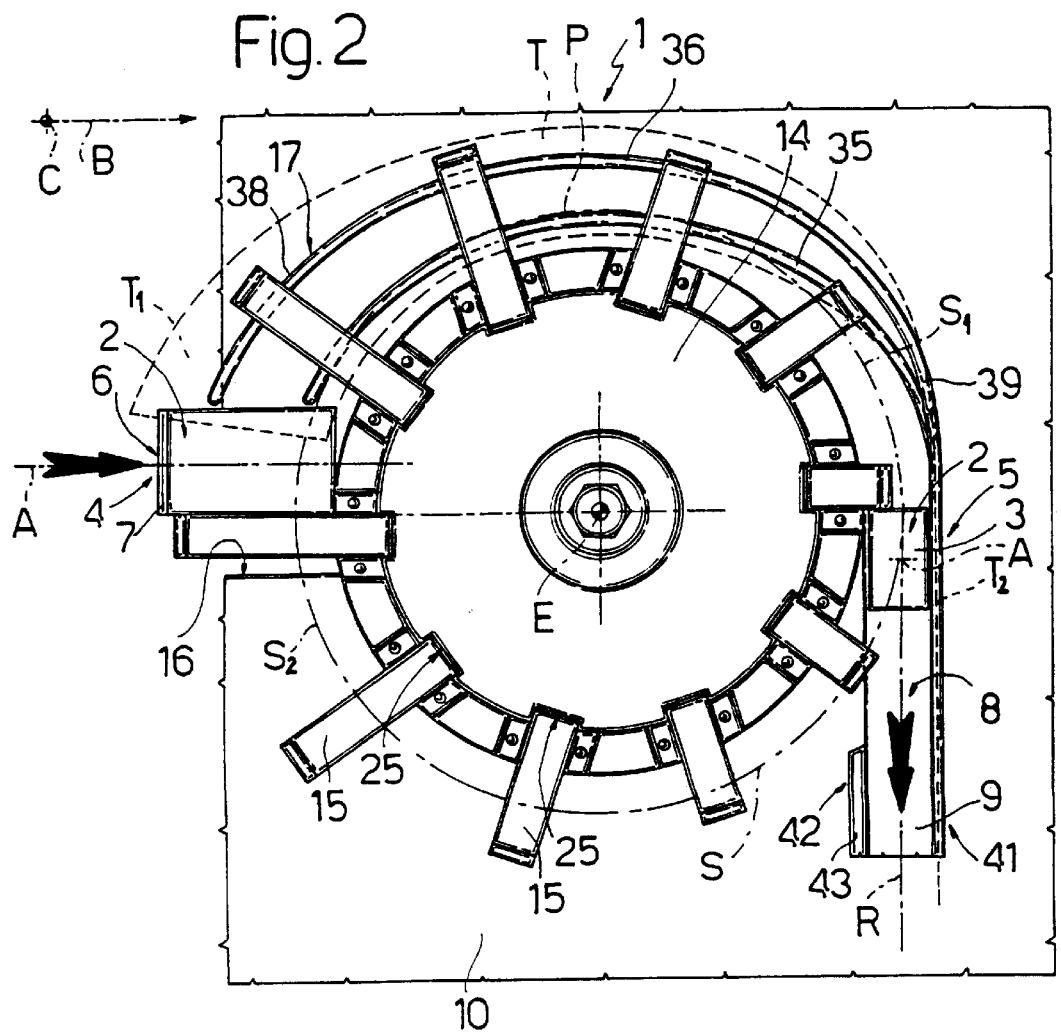
FIG. 2 shows a schematic plan view of the FIG. 1 unit.

With reference to FIGS. 1 and 2, unit 1 provides for continuously feeding a succession of packages 2, along a substantially arc-shaped path P, from a supply station 4 to an output station 5, and for simultaneously and continuously tipping packages 2 from a supply position, in which axis A is oriented in a substantially horizontal direction B, to an output position, in which axis A is oriented in a substantially vertical direction C perpendicular to direction A, and with face 3 upwards.

At station 4, unit 1 continuously and successively receives packages 2 from a chain conveyor 6 not forming part of the present invention and therefore not described in detail. Conveyor 6 comprises a number of flat rectangular blades 7 (only one shown) supporting respective packages 2 with axes A parallel to blades 7, and which, near station 4, travel along a curved trajectory merging with a direction parallel to direction C and perpendicular to blades 7.

The arrangement and operation of blades 7 are described in more detail in European patent application entitled "High-speed folding unit for machines for packaging pourable food products", filed by the present Applicant concurrently with the present application.

At station 5, unit 1 feeds packages 2 successively on to a known output conveyor belt 8 (not described in detail) and along a path R comprising a substantially straight input portion tangent to an end portion of path P. More specifically, station 5 is defined by an intermediate portion of the forward upper branch 9 of conveyor belt 8, to which packages 2 are fed successively at the end of path P.

With reference to FIGS. 1, 2 and 3, unit 1 comprises a fixed base 10 substantially perpendicular to direction C; and a drive shaft 11 fitted through base 10, rotating continuously about a respective vertical axis E parallel to direction C, and driven by an electric motor (not shown) of said packaging machine via a known transmission (not shown).

Unit 1 also comprises a substantially cylindrical rotary member 14 fitted to shaft 11 and of axis E; and a number of push arms 15 connected in articulated manner to a radially outer portion of rotary member 14, equally spaced about axis E, fed by rotary member 14 along a circular path S having a portion $S_1$ in common with path P, and cooperating with respective packages 2 to push packages 2 along path P. For unit 1 to operate correctly, each arm 15 is located, at station 4, parallel to axis A of respective package 2, and lies in a plane through axis E of rotary member 14 (FIG. 2).

More specifically, base 10 projects outwards with respect to rotary member 14, and defines, along path P, a support for packages 2 fed by rotary member 14 towards conveyor 8. At conveyor 6, base 10 comprises a rectangular through opening 16, which is engaged, in use, by a blade 7 supporting a respective package 2, and which, with blade 7, defines station 4. More specifically, the blade 7 engaging opening 16 at a given point in the operating cycle is positioned substantially horizontally and perpendicular to direction C, and is substantially coplanar with the surrounding portion of base 10.

Unit 1 also comprises a curved guide 17 extending substantially along path P, outwards of rotary member 14, and cooperating with packages 2 to move them gradually from the supply position to the output position; and a cam 18 connected integrally to base 10, interposed between base 10 and rotary member 14, and cooperating with each arm 15 to move it, along portion $S_1$ of path S common to path P, from a first operating position interacting with and pushing respective package 2, to a second operating position releasing package 2, and, along the remaining portion $S_2$ of path S, from the second operating position back to the first operating position.

More specifically, in the first operating position, each arm 15 projects outwards from rotary member 14 and is parallel to direction B; and, in the second operating position, arm 15 is parallel to direction C and detached from respective package 2.

Cam 18 forms a continuous constraint for arms 15, and defines, between the first and second operating positions, a continuous succession of intermediate positions wherein each arm 15 interacts with and pushes respective package 2, and wherein arm 15 is gradually oriented from direction B to direction C.

With reference in particular to FIG. 3, rotary member 14 is substantially drum-shaped, and defines a chamber 19 housing cam 18 and shaft 11, and which communicates externally via a substantially circular bottom opening 20 facing base 10. Rotary member 14 also comprises a substantially circular top wall 21 opposite opening 20 and having a through hole 22 engaged by shaft 11 via the interposition of a key 23; and a substantially cylindrical lateral wall 24 having a number of substantially elongated rectangular through slots 25 with respective axes parallel to axis E and housing respective arms 15 hinged to respective pins 29 tangent to rotary member 14.

More specifically, each arm 15 is substantially L-shaped, and comprises a portion 26 for interacting with a respective package 2 and projecting substantially radially from rotary member 14; a tappet portion 27 extending between wall 24 of rotary member 14 and cam 18, and cooperating in sliding manner with cam 18; and a hinge portion 28 interposed between portions 26 and 27 and connected by respective pin 29 to the bottom ends of the lateral edges of respective slot 25. More specifically, each portion 26 is of maximum radial extension with respect to axis E in the first operating position of respective arm 15, and is fully withdrawn inside respective slot 25 in the second operating position of arm 15.

Figure 4:
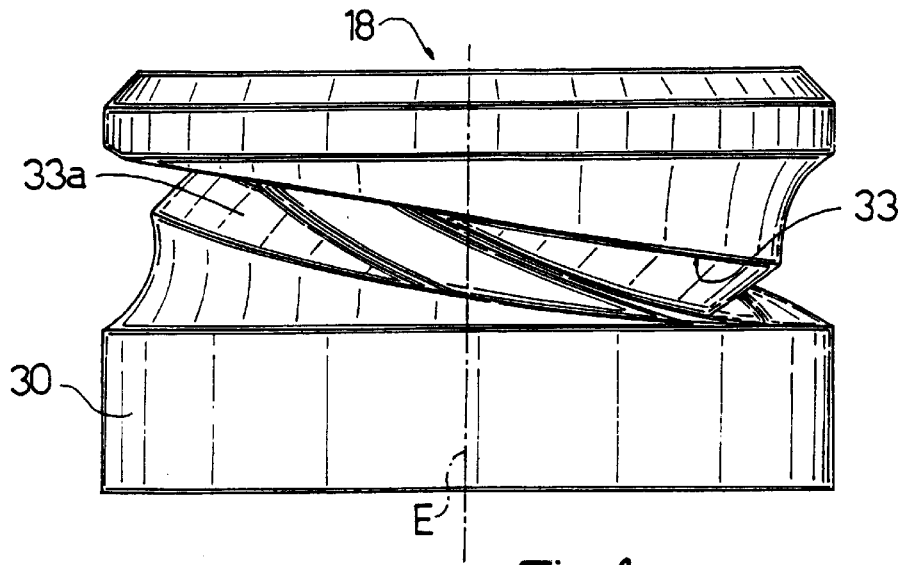
FIG. 4 shows a side view of a detail of the FIG. 1 unit.

As shown in FIGS. 3 and 4, cam 18 comprises a substantially cylindrical tubular body 30 of axis E, fitted at the bottom to base 10, housed partially and loosely inside chamber 19, and fitted through in radially slack manner with shaft 11, which in turn is fitted in axially-fixed rotary manner to body 30 via the interposition of a disk 31 of axis E and a bearing 32.

The radially outer periphery of cam 18 comprises a shaped annular groove 33 engaged in sliding manner by portions 27 of arms 15.

More specifically, groove 33 comprises a first curved portion 33a extending from station 4 to station 5 and downwards towards base 10 so as to move arms 15 from the supply position to the output position; and a second curved portion 33b extending from station 5 to station 4 and upwards towards wall 21 of rotary member 14 so as to restore arms 15 to the supply position.

As shown in FIGS. 1, 2 and 3, guide 17 defines, for packages 2, a sliding and supporting surface T, which extends substantially along path P, and is inclined with respect to base 10 at an angle varying gradually between a substantially horizontal, flat input portion $T_1$ parallel to direction B and adjacent to station 4, and a substantially vertical, flat output portion $T_2$ parallel to direction C and adjacent to station 5.

More specifically, guide 17 comprises a pair of side by side curved cylindrical sections 35, 36 defining surface T, and on which slide respective lateral faces 37 of packages 2 parallel to axes A of packages 2. One (35) of said sections is substantially arc-shaped about axis E between stations 4 and 5, is positioned contacting base 10, and extends beyond station 5 substantially along path R; and the other section 36 extends upwards from station 4 to station 5, from a substantially arc-shaped portion 38 of axis E for receiving packages 2 and positioned contacting base 10, to a substantially arc-shaped portion 39 of axis E for unloading packages 2 on to conveyor 8 and which is detached from base 10. More specifically, portion 38 of section 36 is located radially outwards with respect to section 35 at station 4, and portion 39 is located over and aligned with section 35 at station 5.

Along path P, each package 2 is therefore positioned with face 37 resting on sections 35 and 36, and is so oriented by sections 35, 36 as to bring a respective face 40, parallel to and opposite face 3, gradually into contact with base 10.

Finally, as of station 5, section 36 extends substantially along path R and parallel to section 35, and defines, with section 35, a lateral shoulder 41 for retaining packages 2 along conveyor 8. As of station 5, packages 2 are retained on the opposite side by a further lateral shoulder 42 extending parallel to shoulder 41 and also defined by a pair of curved cylindrical sections 43 parallel to each other and fitted to base 10.

Operation of unit 1 will be described with reference to one package 2, and as of the cycle-start condition in which blade 7 of conveyor 6 supporting package 2 engages opening 16 to keep package 2 in the supply position, and one of arms 15 is set to the first operating position to the side of and upstream from package 2 along path P.

Rotary member 14 and conveyor 6 are so timed in relation to each other that said arm 15 moves package 2 off blade 7 before conveyor 6 releases blade 7 from opening 16, and before opening 16 is engaged by the next blade 7.

As rotary member 14 rotates about axis E, package 2 is fed by respective arm 15 along portion $T_1$ of the surface T defined by sections 35, 36.

As rotary member 14 rotates about axis E, package 2, by virtue of the design of sections 35, 36, is gradually moved into the output position, that is, is gradually tipped so that respective face 40 is brought into contact with and rests on base 10 and, as of station 5, on conveyor 8.

As rotary member 14 rotates, portion 27 of arm 15 slides along portion 33a of groove 33, which is so shaped as to gradually raise arm 15 into the second operating position. By virtue of cam 18, therefore, the position of arm 15 with respect to rotary member 14 is gradually adjusted along path P to adapt to the angle of package 2 with respect to base 10, and so achieve maximum thrust on package 2 by arm 15.

At station 5, portion 33a of groove 33 is so shaped as to move arm 15 into the second operating position inside respective slot 25 and away from package 2, which is fed on to and by conveyor 8 along path R.

As rotary member 14 continues rotating, and as portion 27 of arm 15 slides along portion 33b groove 33, arm 15 is gradually restored from the second to the first operating position.

The advantages of unit 1 according to the present invention will be clear from the foregoing description.

In particular, unit 1 provides for transferring packages 2 continuously and a high output rate (about 8000–24000 packages an hour) from station 4 to station 5, while at the same time tipping packages 2 from the supply to the output position, without damaging or impairing the aseptic quality of packages 2, and without impairing the degree of sterility of the pourable food products contained therein.

Moreover, unit 1 is highly straightforward, compact and reliable.

Clearly, changes may be made to unit 1 as described and illustrated herein without, however, departing from the scope of the claims.

What is claimed is:

1. A unit (1) for transferring and tipping sealed packages (2) containing pourable food products and each having a respective axis (A); said unit (1) feeding a succession of said packages (2) along a first path (P) from a supply station (4) to an output station (5), and simultaneously tipping the packages (2) from a supply position in which said axis (A) is oriented in a first direction (B), to an output position in which said axis (A) is oriented in a second direction (C) crosswise to said first direction (B); characterized by comprising a number of push arms (15) cooperating with and for feeding respective said packages (2) along said first path (P); actuating means (14) for moving said arms (15) along an endless second path (S) comprising at least one portion ($S_1$) in common with said first path (P); guide means (17) extending substantially along said first path (P) and cooperating with said packages (2) to gradually move the packages (2) from said supply position to said output position; and control means (18) for controlling the position of said arms (15) and cooperating with each said arm (15) to move the arm (15), along said portion ($S_1$) of said second path (S) in common with said first path (P), between a first operating position interacting with and pushing a respective said package (2), and a second operating position releasing said package (2).

2. A unit as claimed in claim 1, characterized in that, in said first operating position, each said arm (15) is substantially parallel to said first direction (B), and, in said second operating position, each said arm (15) is substantially parallel to said second direction (C).

3. A unit as claimed in claim 2, characterized in that said control means comprise continuous-constraint means (18) for continuously constraining said arms (15), and defining a continuous succession of intermediate positions wherein each said arm (15) interacts with and pushes the respective said package (2), and wherein said arm (15) is gradually oriented from said first direction (B) to said second direction (C).

4. A unit as claimed in claim 1, characterized by comprising fixed supporting means (10), and in that said actuating means comprise a rotary member (14) rotating, with respect to said supporting means (10), about a respective fixed axis (E) substantially parallel to said second direction (C); said arms (15) being connected in articulated manner to an outer periphery of said rotary member (14); said second path (S) being a circular path; and said first path (P) being substantially arc-shaped.

5. A unit as claimed in claim 4, characterized in that, at said supply station (4), each said push arm (15) is positioned parallel to the axis (A) of the respective said package (2), and lies in a plane through the axis (E) of rotation of said rotary member (14).

6. A unit as claimed in claim 4, characterized in that said rotary member (14) is substantially drum-shaped, and comprises a substantially cylindrical lateral wall (24) having a number of elongated through slots (25) in turn having respective axes substantially parallel to the axis (E) of said rotary member (14) and housing respective said arms (15) hinged to respective pins (29) tangent to the rotary member (14).

7. A unit as claimed in claim 6, characterized in that each said arm (15) projects outwards from said rotary member (14) in said first operating position and said intermediate positions, and is fully withdrawn inside the respective said slot (25) in said second operating position.

8. A unit as claimed in claim 4, characterized in that said continuous-constraint means comprise a cam (18) connected integrally to said supporting means (10) and cooperating with said arms (15) to move the arms (15) from said first operating position to said second operating position along said portion ($S_1$) of said second path (S) in common with said first path (P), and from said second operating position to said first operating position along a remaining portion ($S_2$) of said second path (S).

9. A unit as claimed in claim 8, characterized in that said cam (18) comprises a substantially cylindrical body (30) coaxial with said rotary member (14) and at least partially housed loosely inside a chamber (19) defined by the rotary member (14), and shaped engaging means (33) extending annularly along the outer periphery of said cylindrical body (30); each said arm (15) comprising an interacting portion (26) interacting with a respective said package (2) and projectable outwards from said rotary member (14), a tappet portion (27) extending inside said rotary member (14) and cooperating in sliding manner with said engaging means (33), and a hinge portion (28) for hinging the arm (15) to the rotary member (14) and interposed between said interacting and tappet portions (26, 27).

10. A unit as claimed in claim 9, characterized in that said engaging means comprise an annular groove (33) formed along the radially outer periphery of said cylindrical body (30).

11. A unit as claimed in claim 4, characterized in that said guide means (17) extend outside said rotary member (14), and define, for said packages (2), a supporting and sliding surface (T) inclined with respect to said supporting means (10) at an angle varying gradually from an input portion ($T_1$) parallel to said first direction (B) and adjacent to said supply station (4), to an output portion ($T_2$) parallel to said second direction (C) and adjacent to said output station (5).

12. A unit as claimed in claim 11, characterized in that said guide means (17) comprise a pair of side by side curved sections (35, 36) extending substantially along said first path (P) and so shaped as to define said supporting and sliding surface (T) for said packages (2).

13. A unit as claimed in claim 1, characterized in that said first and second directions (B, C) are perpendicular to each other.

* * * * *